Jan. 15, 1963 E. A. STALKER 3,073,568
COMPOSITE BLADES FOR TURBINES, COMPRESSORS AND THE LIKE
Filed June 27, 1958
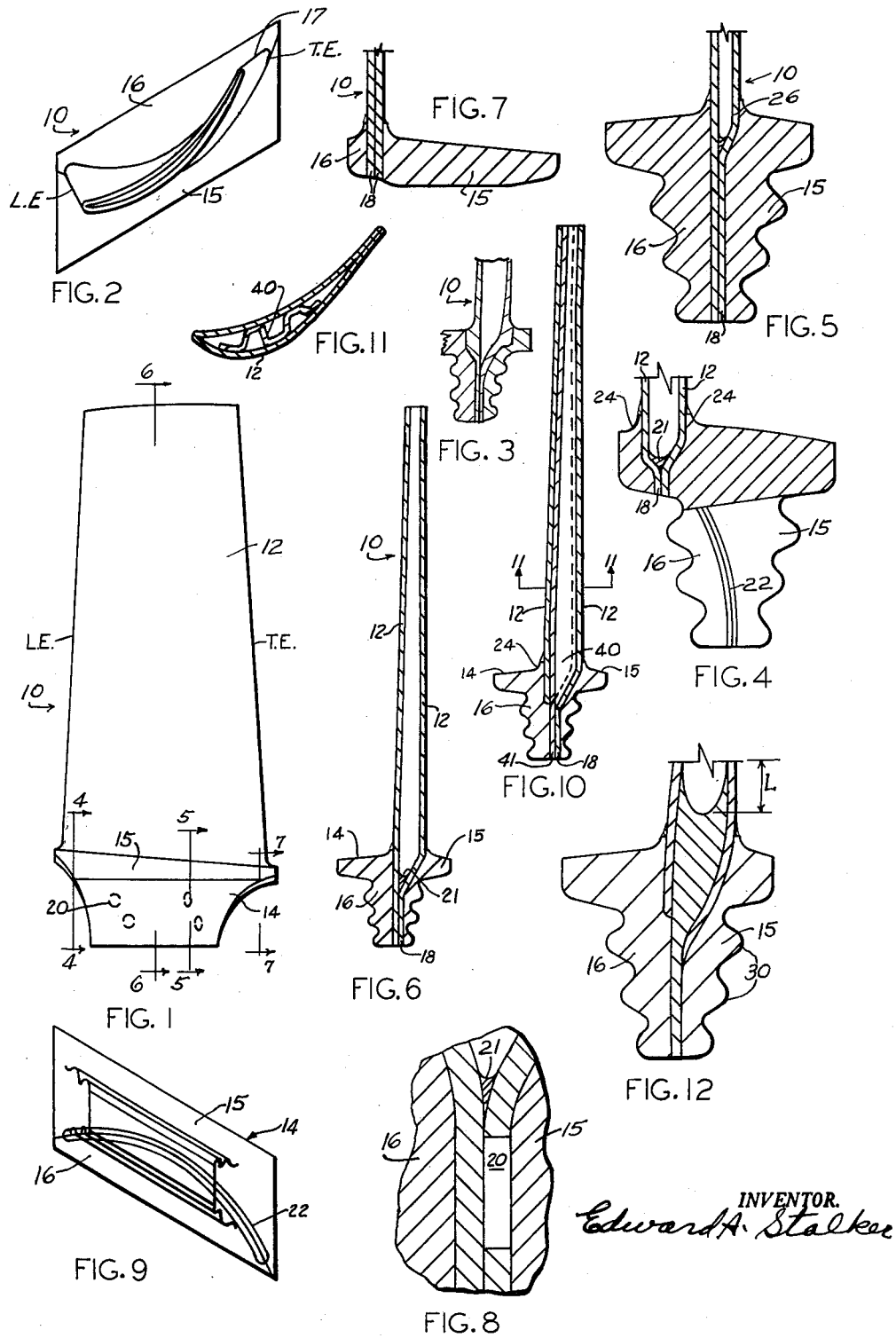
INVENTOR.
Edward A. Stalker United States Patent Office 3,073,568
Patented Jan. 15, 1963

3,073,568
COMPOSITE BLADES FOR TURBINES,
COMPRESSORS AND THE LIKE
Edward A. Stalker, 406 N. Farragut St., Bay City, Mich.
Filed June 27, 1958, Ser. No. 744,942
7 Claims. (Cl. 253—77)

My invention relates to blades for gas turbines which employ compressor and turbine blades.

An object of my invention is to provide an economical replaceable blade of light weight.

Another object is to provide a replaceable composite blade which is readily inspectable.

Other objects will appear from the specification, appended claims, and accompanying drawings.

The above objects are accomplished by the means illustrated in the accompanying drawings in which—

FIG. 1 is a side elevation of a blade according to my invention;

FIG. 2 is a tip end view of the blade;

FIG. 3 is a fragmentary section of an alternate form of blade;

FIG. 4 is a fragmentary section on line 4—4 in FIG. 1;

FIG. 5 is a fragmentary section on line 5—5 in FIG. 1;

FIG. 6 is a fragmentary section on line 6—6 in FIG. 1;

FIG. 7 is a fragmentary section on line 7—7 in FIG. 1;

FIG. 8 is a fragmentary enlarged section on line 6—6 in FIG. 1;

FIG. 9 is a bottom view of the base of the blade of FIG. 1;

FIG. 10 is a section similar to FIG. 6 showing the incorporation of a stem in the blade;

FIG. 11 is a section on line 11—11 in FIG. 10; and

FIG. 12 is a fragmentary spanwise section showing a short solid stem bonded in the blade.

A replaceable blade commonly requires a base for attachment in a rotor.

It is very difficult to produce a hollow blade with a substantial base by forging processes. Yet it is very desirable that the material of the blade shell have the characteristics obtained by working the material as for instance by forging or rolling.

The subject invention provides a blade whose shell is formed from sheet stock or other processed material to provide the proper strength and fatigue properties. It is bonded to a base which is preferably an investment casting in such a manner that the joints between the parts are readily inspectable.

Referring now to the drawings, the blade is indicated generally by 10. It comprises the blade shell 12, and the base 14 which is made in two parts 15 and 16. Preferably the shell is formed from sheet stock, as shown in FIGS. 1 and 2 with a brazed joint 17 along the trailing edge. It might also have an integral trailing edge as for instance by being processed from a tube so that the side walls are continuous about the trailing edge.

The shell is defined preferably by opposite side walls fixed together at the leading and trailing edges L.E. and T.E. respectively. At the root, the walls are formed to bring them together or within brazing proximity so that substantial portions 18 are bonded together for a distance up from the bottom of the base. See particularly FIGS. 5 and 6.

The complementary base parts, 15 and 16, are cast or otherwise finished to shape to fit against the deformed sides of the root portion of the shell. These parts are then all bonded together preferably by a high temperature braze. The root portion 18 of the shell between the base parts extends in the chordwise direction to the bottom of the base and to the opposite ends of the base.

The braze in any form such as a powder or paste is placed in suitable holes 20 in the shell walls, two or more in each wall. Braze is also placed at 21. When the blade is heated to the flow temperature of the braze, it flows throughout the contacting areas to the edges which are exposed to view at all sides of the base. The presence of a continuous line of braze throughout the length of the exposed edges 22, FIG. 9, is inspection evidence that the braze has flowed properly to bond the parts together. These are preferably inspected by a penetrant and ultra-violet light according to a well known technique. A further check is obtained by radiographing the base.

The holes in the portion of the shell within the base serve two purposes, one to hold the braze material as remarked earlier and the other to facilitate X-ray inspection. The braze areas of the picture of the joint on the X-ray film may be compared with the areas of the holes to detect voids in the braze.

The shell may have walls preferably increasing in thickness inward with a substantial local increase in thickness beginning just above the base and extending toward its bottom for a substantial distance past the top of the base. See FIG. 3. Preferably also the base has a fillet 24 cast or machined on it to reduce stress concentration at the juncture of blade wall and base. The increased thickness of the wall opposite the fillet also serves the same purpose. The walls should also have a spanwise straight portion inward of the base for a substantial distance, as shown at 26 in FIG. 5, before the wall is curved.

The blade may have a corrugated stem 40, FIGS. 10 and 11, which preferably extends over a major portion of the span. One of the walls of the shell is terminated at about mid-length of the base and a sheet-like portion 41 of the stem continues to the bottom edge in brazing proximity to the other wall. Thus the stem is bonded directly to the base parts 15 and 16 and transfers some of the blade load directly to the base via the stem. The shell also transfers its load directly to the base parts.

The corrugations in the stem are substantially transverse to the side walls and transform at the end of the shell to the sheet-like portion 41 so that the base parts are separated by substantially the sheet thickness of the stem. The stem sheet extends laterally to the opposite ends of the base to present its edge to view.

As shown in FIG. 12 a short solid stem may also be used. It should extend upward in the blade beyond the base and should terminate in spaced legs tapering to a feather edge each bonded to a side wall of the shell. The legs should be long enough so that the bonded area along their length L is sufficient to carry the centrifugal load of the blade. Preferably the length L is about as great as the maximum thickness of the blade or larger.

The tapered legs, since they are relatively thin, will permit sharp pictures of voids to be obtained by X-ray inspection.

The base is preferably given the usual fir-tree securing means by provision of the splines 30 for securing it in a rotor.

It will now be clear that I have provided a novel blade which is economical and light in weight, and which can be inspected with respect to its bonded joints.

While I have illustrated specific forms of the invention, it is to be understood that variations may be made therein and that I intend to claim my invention broadly as indicated by the appended claims.

I claim:

1. In combination in a hollow blade for turbines, compressors, and the like, walls defining a hollow shell having integral root portions at the root of the blade brought into brazing proximity with each other over a substantial spanwise extent and bonded together by braze, and complementary base parts fitting against opposite sides of said root portions and bonded thereto by high temperature braze defining a blade base with said portions extending into said base, at least one of said root portions extending in the general chordwise and spanwise directions to the edges of said base parts presenting the braze at the edges of said one portion to view along the ends and bottom of said base, said base parts having securing means for securing said blade in a rotor.

2. In combination in a hollow blade for turbines, compressors, and the like, walls defining a hollow shell having a root portion at an end thereof, a stem positioned within said shell and bonded to the inner wall surfaces of said root portion over a major portion of the spanwise length thereof, said stem extending spanwise outside said shell at the root thereof, and complementary base parts fitting against opposite sides of said root portion and stem and secured to each said side by braze defining joints, said stem and root portion extending to the bottom of said base presenting the edges of said joints to view.

3. In combination in a hollow blade for turbines, compressors, and the like, walls defining a hollow shell having a root portion at an end thereof, complementary base parts fitting against opposite sides of said root portion, a stem positioned within said shell and bonded to the inner wall surfaces of said root portion, said stem extending spanwise outside said shell at the root thereof, and complementary base parts fitting against opposite sides of said root portion and stem and bonded to each said side by fused metal defining joints, said stem having spaced legs extending tipward each tapering to a thin edge, said stem extending to the bottom of said base presenting the edges of said joints to view.

4. In combination in a hollow blade for turbines, compressors, and the like, walls defining a hollow shell having a root portion at one end thereof, a stem positioned within said shell and having spaced wall portions substantially normal to the walls of said shell transforming into a sheet-like portion in brazing proximity with said root portion, complementary base parts fitted against opposite sides of said shell with said root portion and sheet-like portion extending into said base, and said base parts being secured to each other and to said root and sheet-like portions by fused metal visible from outside said blade.

5. A hollow blade for turbines, compressors, and the like, comprising a split base having means defining an opening between the halves thereof, a hollow sheet metal blade shell having integral opposite root portions formed thereon extending into said opening, said root portions being brought together within brazing proximity to each other and arranged to receive fusible metal with at least one of said portions being formed coextensively with the parting plane defined by said halves at the bottom and ends thereof for the visible inspection of the fused product of such metal at the contacting edges of the base and the shell.

6. The blade as defined in claim 5 including a stem received within said shell and having a sheet-like portion arranged substantially coextensively in brazing proximity with said one portion.

7. In combination in a hollow blade for turbines, compressors, and the like, walls defining a hollow shell having integral root portions at the root of the blade brought into brazing proximity with each other over a substantial spanwise extent and bonded together by braze, complementary base parts fitting against opposite sides of said root portions and bonded thereto by high temperature braze defining a blade base with said portions extending into said base, at least one of said root portions extending in the general chordwise direction through said base parts presenting an exposed edge joint along the bottom of said base parts to view, and said base parts having securing means for securing said blade in a rotor.

References Cited in the file of this patent

UNITED STATES PATENTS

| | | |
|---|---|---|
| 2,656,146 | Sollinger | Oct. 20, 1953 |
| 2,817,490 | Broffitt | Dec. 24, 1957 |
| 2,848,193 | Sells | Aug. 19, 1959 |
| 2,873,944 | Wiese | Feb. 17, 1959 |
| 2,963,269 | Gerdan et al. | Dec. 6, 1960 |

FOREIGN PATENTS

| | | |
|---|---|---|
| 574,440 | Great Britain | Jan. 4, 1946 |
| 716,612 | Great Britain | Oct. 13, 1954 |
| 729,665 | Great Britain | May 11, 1955 |
| 298,592 | Switzerland | July 16, 1954 |